United States Patent [19]

Fieldhouse

[11] 3,952,086

[45] Apr. 20, 1976

[54] PURIFICATION OF CRUDE CHLOROPHOSPHAZENE COMPOUNDS BY TREATMENT WITH BRONSTED BASES

[75] Inventor: John William Fieldhouse, Mogadore, Ohio

[73] Assignee: The Firestone Tire & Rubber Company, Akron, Ohio

[22] Filed: Oct. 7, 1974

[21] Appl. No.: 512,645

[52] U.S. Cl. .............................................. 423/300
[51] Int. Cl.² ........................................ C01B 25/10
[58] Field of Search ..................................... 423/300

[56] References Cited
UNITED STATES PATENTS 2,872,283  2/1969  Taylor................................. 423/303
3,575,693  4/1971  Emsley et al. ...................... 423/303

*Primary Examiner*—Oscar R. Vertiz
*Assistant Examiner*—Gregory A. Heller

[57] ABSTRACT

A process for the purification of crude chlorophosphazene involves adding a Bronsted base to a vessel containing crude chlorophosphazene, removing water formed in the vessel from the reaction of the Bronsted base with the impurities in crude chlorophosphazene and then removing at least a very high purity cyclic chlorophosphazene trimer.

36 Claims, 2 Drawing Figures

3,952,086

PURIFICATION OF CRUDE CHLOROPHOSPHAZENE COMPOUNDS BY TREATMENT WITH BRONSTED BASES

BACKGROUND OF THE INVENTION

The present invention relates to a process for the purification of crude chlorophosphazene. More specifically, the present invention relates to the utilization of Bronsted bases in a non-aqueous environment and the subsequent removal of any water produced followed by the removal of the purified cyclic trimer of chlorophosphazene. Alternatively, the water produced by the reaction of acid impurities in crude chlorophosphazene and Bronsted bases can be made to form stable hydrates with drying agents such as magnesium sulfate, calcium sulfate or calcium chloride.

Heretofore, in the production of chlorophosphazenes or phosphonitrilic chlorides, purity of the compounds generally was not a factor since their specific uses such as for flame retardants and thermally resistant resins did not require removal of contaminates. Generally, chlorophosphazenes $(NPCl_2)_x$ where $x$ equals 3 through 9 are largely produced by the reaction of phosphorus pentachloride and ammonium chloride which results in compounds, that is, $x = 3 - 9$, having a high degree of impurities. Although several methods of purification are available, a good degree of purification to date has been difficult, if not impossible, to achieve. Thus, chlorophosphazenes which are contaminated with impurities, upon heating in excess of 250°C will result in gelled polymers which are benzene insoluble.

The general approach of prior art methods of purification has been the separation of isomers of chlorophosphazene, either by utilization of the differences of boiling points of the isomers or by the different reactivities of the isomers with aqueous bases. Specific purification methods have involved the extraction of chlorophosphazene from petroleum ether solutions with sulfuric acid, U.S. Pat. No. 3,008,799; controlled crystallization in a variety of solvents, U.S. Pat. No. 3,378,353; separation of the trimer and tetramer from the produced mixtures through distillation involving a spinning band column, U.S. Pat. No. 3,379,510; contacting molten chlorophosphazenes with an inert solvent vapor so as to selectively vaporize the cyclic trimer polymer, separating a solvent vapor phase laden with trimer and some tetramer from the molten polymer residue, condensing it to form a solution of trimer and tetramer in the solvent and subsequently recovering trimer together with some tetramer from the solution, U.S. Pat. No. 3,677,720; steam distillation of chlorophosphazenes resulting in hydrolysis of $x = 4 - 9$ and hence separation of the trimer, Chemical Abstracts, Volume 77, Page 540, 159648D (1972) and saponification and hydrolysis of chlorophosphazenes by treatment with aqueous sodium or ammonium hydroxide resulting in unreacted trimer and tetramer, U.S. Pat. No. 3,694,171. Considering the last method, that is U.S. Pat. No. 3,694,171, the examples clearly indicate that a high percentage, that is from about 5 to 15 percent of tetramer is obtained with the trimer along with fair amounts of residue and the solvent after the water has reacted with and hydrolyzed the high cyclic compounds to form water soluble compounds which are then decanted. According to the above methods, a final high degree or goal of the ultimate purified product is not stated nor do these methods have the ability to produce water-free chlorophosphazenes.

SUMMARY OF THE INVENTION

It is, therefore, an object of the present invention to provide a process for the purification of chlorophosphazenes and particularly highly purified trimers and tetramers of chlorophosphazene.

It is another object of the present invention to provide purified chlorophosphazenes, as above, which polymerize into a gel-free benzene soluble polymer.

It is a further object of the present invention to provide purified chlorophosphazenes, as above, through a process whereby contaminates and impurities are removed.

It is an additional object of the present invention to provide purified chlorophosphazenes, as above, whereby the contaminates and impurities, thought to be acidic in nature, are mixed with anhydrous Bronsted bases which selectively react with the acids and do not affect the chlorophosphazene, that is the phosphorous chlorine bond.

It is still another object of the present invention to produce purified chorophosphazenes, as above, which are waterfree.

These and other objects of the present invention are described in detail without attempting to discuss all of the various modifications in which the invention might be embodied; the invention being measured by the appended claims and not by the details of the specification.

In general, a process for the purification of crude chlorophosphazene comprises the steps of adding a Bronsted base to a vessel containing the crude chlorophosphazene, heating said vessel, removing water formed in said vessel and removing at least the cyclic trimer of the chlorophosphazene.

DESCRIPTION OF THE PREFERRED EMBODIMENTS

Figure 1:
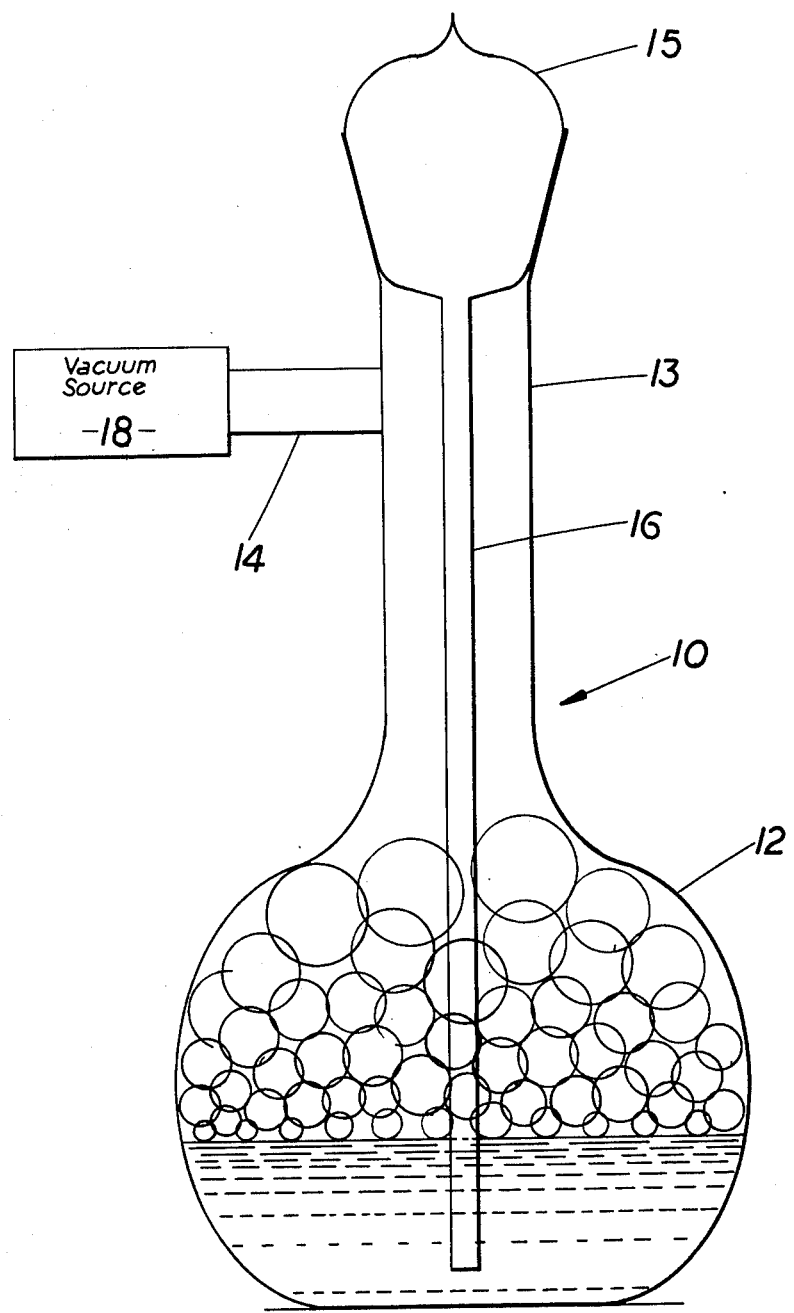
FIG. 1 is a schematic view of an apparatus for removing water of complexing water with dehydrating agents and reacting acidic impurities in chlorophosphazene with Bronsted bases.

According to the concepts of the present invention, crude chlorophosphazenes are highly purified through the use of Bronsted bases so that the chlorophosphazenes can be polymerized into a gel-free benzene soluble polymer. The impurities contaminating chlorophosphazene, thought to be acidic in nature, can be removed from the crude chlorophosphazene according to the present invention since it is thought that the Bronsted base reacts with the acid and does not affect the phosphorus-chlorine bond of the chlorophosphazenes.

Crude chlorophosphazenes or phosphonitrilic chlorides crude can be obtained by conventional processes such as the reaction of phosphorus pentachloride and ammonium chloride whereby $(NPCl_2)_x$ cyclic compounds are produced wherein $x$ is an integer of 3 through 9. Depending, of course, upon the particular mode, manner and variables as well known to one skilled in the art, the amounts of various cyclic chlorophosphazene compounds produced will vary. However, generally a substantial amount of cyclic trimer (about 60 percent) can be produced along with a fair amount of cyclic tetramer (about 20 percent) with the remainder being cyclic compounds where $x = 5 - 9$.

The chlorophosphazene crude produced is placed in a vessel container or pot and an amount of Bronsted base added. In general, Bronsted bases can be utilized according to the present invention since they selectively react with the acid impurities contained in the crude and not yet affect the various cyclic compounds. Preferred Bronsted bases include the metals of Group 1A and 2A of the Periodic Table such as the following compounds, the metal hydroxides, the metal phosphates, and the metal carbonates. Additionally, the metal bicarbonates and the metal oxides can be utilized. Thus, preferred compounds include lithium hydroxide, sodium hydroxide, potassium hydroxide, magnesium hydroxide, calcium hydroxide, and similarly these same metals when combined with phosphate, carbonate, bicarbonate and oxide. Generally, the Bronsted bases containing calcium such as calcium hydroxide, calcium phosphate, and calcium carbonate are highly preferred due primarily to economic considerations. Calcium carbonate and calcium hydroxide are very preferred. Moreover, to prevent hydrolysis, Bronsted bases which are relatively anhydrous or can be added in an anhydrous condition are favored. Therefore, Bronsted bases which form water of hydration are to be avoided. Since the reaction between the Bronsted base and the impurities in the crude chlorophosphazene is heterogeneous or two-phase, generally finely divided Bronsted bases are desirable. A suitable particle size has been found to be from about 10 to 20 microns. Since the Bronsted bases containing calcium can be readily obtained in a fine particle size, such bases are highly desirable for this additional reason.

Generally, a desirable amount of Bronsted base by weight will be a slight excess compared to the weight of the impurities. Although the impurities in crude chlorophosphazene will vary from batch to batch and depending upon the type of production process, usually such impurities will be in excess of one percent and generally not in excess of ten percent. Exceedingly high amounts such as about 40%, will be very difficult if not impossible to purify due to premature polymerization. However, it has been found that typical production batches will generally contain from about 2 percent to about 5 percent by weight of impurities. Accordingly, a general range of Bronsted bases is at least 1 mole percent and generally from 1 to 11 mole percent by weight based upon the weight of the crude chlorophosphazene and more desirably from about 2 mole percent to about 6 mole percent by weight of a Bronsted base.

According to the present invention, the Bronsted bases react with the impurities which are generally thought to be acids and do not affect the phosphorus-chlorine bond of the chlorophosphazenes. Thus, it is highly desirable that water be kept out of the vessel of the chlorophosphazene mixture since it will react with and destroy cyclic compounds, that is $x$ equal to 5 through 9, quite rapidly, and also the tetramer and trimer cyclic compounds but with a decreasing reaction rate. Hence, it is very desirable to add water-drying agents such as dessicants which, of course, exhibit a strong affinity for water and prevent the water from reacting with the chlorophosphazenes. Dessicants which therefore contain little, if any, hydrate of water in commercial form and which do not start to lose water hydration until temperatures generally in excess of 150°C are therefore preferred. Examples of such drying agents include calcium chloride, calcium sulfate and magnesium sulfate. Since as previously noted, the reaction of the Bronsted bases with the chlorophosphazenes is heterogeneous or two-phase, fine particle size drying agents are desirable to aid in removing any traces of water. Since care should be taken in transferring the crude chlorophosphazenes to the vessel or container, to prevent any contact with water or moisture, only a small amount of drying agent is usually required. Of course, an excess amount is highly desirable and an approximate amount may range from about two percent to about four percent by weight based upon 100 parts of crude chlorophosphazene.

The crude chlorophosphazene is placed in a vessel or container by any conventional procedure whereby it is kept free of water and moisture. Boiling chips may be added if desired. The vessel may be any type of container or device which can be heated and may in fact be even the pot in which the crude chlorophosphazene was produced. A Bronsted base according to the concept of the present invention is added to the vessel in an amount by weight which is in excess of the amount of impurities in the crude. Heat is then applied to the vessel causing the Bronsted bases to selectively react with the acidic impurities in the crude to form metal salts and water. Since the water is highly undesirable, it is immediately removed upon formation by applying a vacuum to the vessel and to a reflux column. The temperature to which the vessel is heated generally may range from about 130° to about 200°C with a slight or partial vacuum so as to not allow any moisture to get back in the system. Desirably, the temperature should be below 175°C to avoid the onset of polymerization. Thus, as should be apparent to one skilled in the art, any temperature below 175°C with a vacuum applied to the vessel to remove the water is desirable in the present invention. A preferred reflux temperature range has been found to be about 155°C to about 170°C with a temperature of approximately 160°C being highly preferred. At temperatures below 150°C, there exists a risk of incomplete reaction of the Bronsted bases with the acidic impurities. It is noted that the temperatures set forth above are pot temperatures, that is the temperature of the heated material or crude.

Generally, the desired vacuum to remove the formed water can vary over a very wide range, that is from a slight or partial vacuum to a very high vacuum. A vacuum of approximately 25 to approximately 50 millimeters of mercury has been found to produce a good reflux condition without sucking off a substantial amount of the crude. Although the refluxing step may even be carried out at atmospheric pressure, such a pressure does not generally remove the risk of allowing water or moisture to enter back into the vessel and therefore, of course, is undesirable. The vaporized water can be collected in any conventional manner such as in cold traps outside of the vessel and the total reflux time will vary depending upon the amount of acid present in the crude but will usually be complete in 30 to 90 minutes. Of course, use of desirable dry anhydrous Bronsted bases will minimize side reactions with the crude chlorophosphazene. Additionally, the Bronsted bases will react with or tie up all oxygen-containing species to form water which is quickly removed. Traces of impurities from incomplete reaction of the crude such as phosphorus pentachloride or phosphorus trichloride, Bronsted acids, are tied up by reaction with the bases.

In general, mixing aids are not required since the mass of material in the vessel is similar to a highly bubbling pot and thus insures good mixing of the heterogeneous system.

Any conventional reflux system may be utilized, such as the typical apparatus disclosed in FIG. 1. generally indicated by the numeral 10. The vessel containing the crude chlorophosphazene, Bronsted base, and desirably, drying agents and boiling chips is indicated by the numeral 12. Reflux column or neck 13 extends from vessel 12 and has a vacuum take-off 14. A thermal couple well 15 may exist at the top of the reflux column having a tube 16 extending into the vessel. A vacuum source generally indicated by the numeral 18 may be any conventional apparatus and contains cold traps not shown to collect the removed water.

The next step involves the removal of the purified chlorophosphazene through distillation wherein primarily the cyclic trimer and cyclic tetramer are distilled. In order to obtain first the trimer which, of course, vaporizes or boils at a lower temperature, the vacuum may be reduced. However, first the pot temperature of the vessel is usually reduced to the approximate preferred range of about 110° to about 120°C with the vacuum then increased to preferably about 10 to about 15 millimeters of mercury. Next, heat is applied to the columns of the distillation system and then heat is reapplied to the vessel such that the pot temperature ranges from about 120° to about 130°C. A preferred temperature is approximately 128° at about 10 or 15 millimeters of mercury. Of course, other pot temperatures outside of the preferred range can readily be utilized with different combinations of vacuum as well known to one skilled in the art. The important aspect is to distill the desired chlorophosphazene and to avoid a too high of a temperature such as to promote polymerization of the chlorophosphazene or to avoid too low of a vacuum so as to cause the chlorophosphazenes to bubble over into the condensation or collection vessel of the distillation system. Upon an increase in vacuum and/or a decrease in temperature from the reflux step, a highly purified trimer of chlorophosphazene can be obtained. Generally, the isomer obtained merely depends upon the distillation temperature since virtually all of the impurities will have been reacted with the Bronsted bases in the first of refluxing step. Thus, it is not unusual according to the present invention to obtain in excess of 99 percent of the trimer with less than 1 percent of the tetramer with a 0.0 parts per million amount of water. Of course, careful distllation can readily render 100 percent trimer with little or no traces of tetramer.

After removal of the trimer, the vacuum can be increased and/or the temperature increased to withdraw the tetramer. Preferred distillation conditions for obtainment of the tetramer have been found to include a vacuum range of about one to about 5 millimeters of mercury and a temperature range of about 140° to about 150°C. Of course, as well known to one skilled in the art, different temperatures in combination with different vacuums can be utilized to obtain distillation. In any event, high purified tetramer can be readily obtained which is relatively free from other cyclic chlorophosphazenes, that is, $x$ equal three or five and above and totally free from other impurities such as water. During the distillation process, all of the impurities will be retained in the vessel as metal salts with the water having previously been collected during the reflux step.

In a similar manner, the remaining cyclic chlorophosphazenes wherein $x$ equals 5 − 9 can be collected in very pure form, that is free from impurities, and also relatively pure or free from adjacent so-called homologs. The obtained trimers, tetramers and the like since they are highly pure can readily polymerize into a gel-free benzene soluble polymer.

Figure 2:
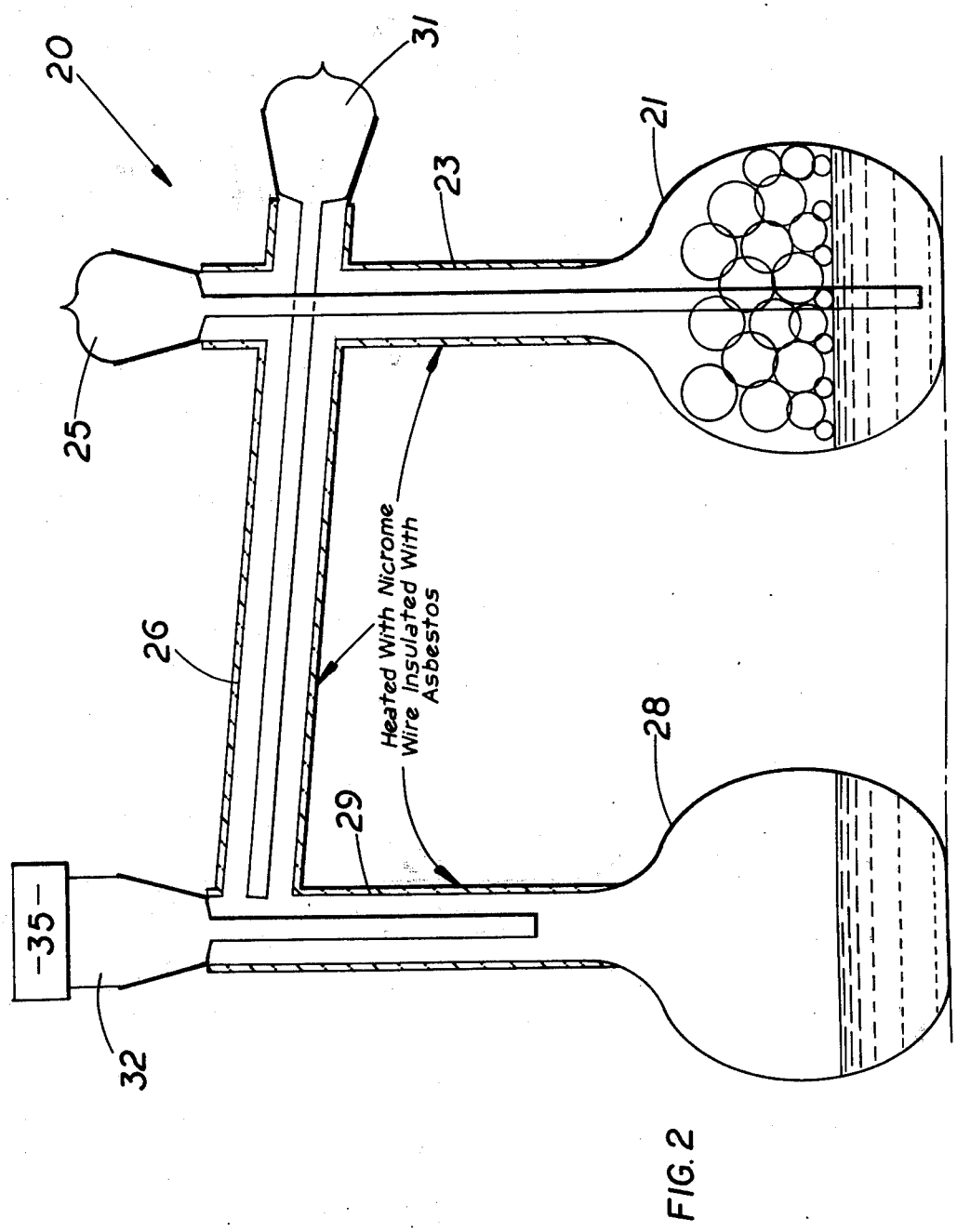
FIG. 2 is a schematic view of an apparatus for obtaining purified chlorophosphazene.

The distillation step can be carried out according to any conventional distillation process utilizing conventional equipment a typical example of which is shown in FIG. 2 wherein the distillation system is generally indicated by the numeral 20.

A heated vessel generally indicated by the numeral 21 may have a neck portion 23 and contain a thermocouple well 25. Preferably, the heating portion of the distillation system may be the same reflux apparatus as shown in FIG. 1 with the vacuum source being disconnected and the reflux system connected to a condensing portion of a distillation system. Naturally, such a set-up would eliminate the requirement of transferring the material contained in the vessel and possible contamination with water or moisture. The connecting column 26 joins the heated vessel with a condensation vessel 28 preferably having a neck 29. Thermal couple wells 31 and 32 may be placed respectively within connection column 26 and condensation vessel 28 to record the temperatures therein to aid in establishing ideal conditions for distillation. A vacuum source generally indicated by the numeral 35 is located on the top of the condensation neck. To prevent premature condensation of the purified chlorophosphazene, vessel neck 23 connecting column 26 and condensation neck 29 are heated with nicrome wire insulated with asbestos. As should be apparent to one skilled in the art, many other different types of distillation set ups and apparatus may be utilized without departing from the scope or the spirit of the present invention.

The extremely high purity trimers, tetramers, or other chlorophosphazenes produced according to the present invention can be polymerized for utilization where purity is generally an important or critical factor. Since polymerized chlorophosphazenes have unique low as well as high temperature stability and behave very much like rubber, such polymers may be used wherever temperature extremes are encountered and yet flexibility is desired. Thus, hoses, for example, automotive and industrial, gaskets, seals, and lubricants are very useful product forms of polymerized high purity chlorophosphazenes.

The purification of chlorophosphazenes according to the present invention will be more fully understood by reference to the following examples and tables:

Several runs were made adding crude chlorophosphazene to a vessel along with a slight excess of a preferred metal hydroxide Bronsted base such as calcium hydroxide. In general this amount was 4 to 6 weight percent. Several boiling chips were added to the vessel along with 4 to 6 weight percent of calcium sulfate drying agent. The vessel was then heated to reflux at a temperature of between 155° to 170°C for the various runs with an applied vacuum of between 25 and 50 millimeters of mercury. Upon heating, the calcium hydroxide reacted with the acidic impurities in the crude to form metal salts and water with the water generally immediately being vaporized and collected in cold traps. The reflux time depends upon the amount of acid impurities present and range from 30 to 90 minutes. The vessel was allowed to cool to between 110° and 120°C. A condensation vessel and system was attached to the reflux vessel while maintaining a vacuum and the vacuum then increased to between 10 and 15 millimeters of mercury. Heat was applied to various portions of the system other than the heating vessel and the condensation vessel of a typical distillation system as shown in FIG. 2 to prevent precondensation of a trimer. Heat was reapplied to the heating vessel, between 120° and 130°C, and the distillation allowed to proceed for approximately 60 minutes. Upon removal of all of the trimer, the distillation was stopped although the vacuum could be increased and/or the temperature increased to obtain the tetramer. Table 1 sets forth the amount of trimer obtained along with the amounts of tetramer, water and hydrogen chloride vapor.

TABLE 1

| Sample | Base | $(PNCl_2)_3$ | $(PNCl_2)_4$ | ppm $H_2O$ | HCl (g) evolved from Distillate |
|---|---|---|---|---|---|
| 1 | $Ca(OH)_2$ | 98.08 | 1.91 | 0.0 | None |
| 2 | $Ca(OH)_2$ | 99.57 | 0.43 | 0.0 | None |
| 3 | $Ca(OH)_2$ | 99.36 | 0.64 | 0.0 | None |
| 4 | $Ca(OH)_2$ | 89.32 | 10.68 | 0.0 | None |
| 5 | $Ca(OH)_2$ | 100.00 | 0.0 | 0.0 | None |
| 6 | $Li(OH)$ | 98.75 | 1.25 | 0.0 | None |

As can be seen from Table 1, the composition of the condensate was the very purified trimer of chlorophosphazene containing zero parts per million of water. Sample 4 indicates that if temperature and vacuum conditions are not suitable for the trimer, portions of the tetramer can be obtained as well. However, as indicated by sample 5, when adjusted, totally pure trimer can be obtained.

In a similar manner, several additional runs were made utilizing various Group 1A and 1B metals of hydroxide and carbonate along with different drying agents and the lack of drying agents whatsoever. The results of these runs are set forth in Table II.

TABLE II

| Sample No. | Base | Drying Agent | % x=3 | % x=4 | ppm $H_2O$ | HCl evolved from distillate |
|---|---|---|---|---|---|---|
| 7 | $Ca(OH)_2$ | $MgSO_4$ | 98 | 2 | 10.0 | None |
| 8 | $Ca(OH)_2$ | $MgSO_4$ | 83 | 17 | 1.0 | None |
| 9 | $Ca(OH)_2$ | $MgSO_4$ | 83 | 17 | 10.0 | None |
| 10 | $Ca(OH)_2$ | $MgSO_4$ | 6 | 93 | 0.0 | None |
| 11 | $Na_2CO_3$ | None | 100 | 0 | 90.0 | Some |
| 12 | $K_2CO_3$ | None | 100 | 0 | 59.0 | — |
| 13 | $Na_2CO_3$ | None | 100 | 0 | 71.0 | Some |
| 14 | $Na_2CO_3$ | None | 100 | 0 | 93.0 | Some |
| Control | None | None | 97 | 3 | 69.0 | Some |
| 15 | $CaCO_3$ | $CaSO_4$ | 99 | 1 | 0.0 | None |
| 16 | $CaCO_3$ | $CaCl_2$ | 98 | 2 | 0.0 | None |
| 17 | $CaCO_3$ | $CaSO_4$ | 93 | 7 | 0.0 | None |

As readily apparent from Table II, the composition of the condensate once again contained very purified trimer or tetramer of chlorophosphazene containing no more than 10 parts per million of water wherein drying agents were utilized. Less than 20 parts per million of water is generally considered to be very good. When the drying agent was not utilized, the chlorophosphazenes contained some water in the distilled trimer and tetramer.

What is claimed is:

1. A process for the purification of crude chlorophosphazene comprising the steps of:

adding at least 1 mole percent based on the crude of a Bronsted base to a vessel containing the crude chlorophosphazene, said Bronsted base selected from the group consisting of the 1A and 2A metals of hydroxides, carbonates, phosphates, bicarbonates and oxides, applying a partial vacuum to said vessel, heating said vessel to a temperature of from about 130°C to about 200°C and removing water produced in said vessel by said heating, and removing at least the cyclic chlorophosphazene trimer from said vessel.

2. A process for the purification of crude chlorophosphazene according to claim 1, including the additional steps of adding a drying agent to said vessel.

3. A process for the purification of crude chlorophosphazene according to claim 2, wherein said vessel is heated from about 155°C to about 170°C and said vacuum is from about 25 to about 50 mm of mercury.

4. A process for the purification of crude chlorophosphazene according to claim 2, including obtaining at least said cyclic chlorophosphazene trimer by distillation.

5. A process for the purification of crude chlorophosphazene according to claim 4, wherein said distillation is carried out from about 120°C to about 130°C and said vacuum is from about 10 to about 15 mm of mercury.

6. A process for the purification of crude chlorophosphazene according to claim 3, wherein said amount of drying agent ranges from about 2 percent to about 4 percent and is selected from the group consisting of calcium chloride, calcium sulfate and magnesium sulfate.

7. A process for the purification of crude chlorophosphazene according to claim 2, wherein said Bronsted base is selected from the group consisting of the 1A and 2A metals of hydroxides, phosphates, and carbonates.

8. A process for the purification of crude chlorophosphazene according to claim 7, wherein said compound is calcium hydroxide.

9. A process for the purification of crude chlorophosphazene according to claim 1, wherein said amount of said Bronsted base is from about 1 mole percent to about 11 mole percent.

10. A process for the purification of crude chlorophosphazene according to claim 4, including the additional step of adding the crude chlorophosphazene to said vessel.

11. A process for the purification of crude chlorophosphazene according to claim 1, wherein by weight said crude chlorophosphazene is 100 parts and said added amount of said Bronsted base is a slight excess based upon the weight of acidic impurities in said chlorophosphazene.

12. A process for the purification of crude chlorophosphazene according to claim 5, wherein said distillation temperature is approximately 128°C.

13. A process for the purification of crude chlorophosphazene according to claim 9, wherein said Bronsted base is selected from the group consisting of the 1A and 2A metals of hydroxides, phosphates and carbonates.

14. A process for the purification of crude chlorophosphazene according to claim 9, wherein said Bronsted bases are selected from the group consisting of the lithium, sodium, potassium, magnesium and calcium metals of hydroxides, phosphates, carbonates, oxides and bicarbonates.

15. A process for the purification of crude chlorophosphazene according to claim 9, wherein said Bronsted base is selected from the group consisting of calcium hydroxide, calcium phosphate and calcium carbonate.

16. A process for the purification of crude chlorophosphazene according to claim 9, wherein said Bronsted base compound is selected from the group consisting of calcium hydroxide and calcium carbonate.

17. A process for the purification of crude chlorophosphazene according to claim 9, wherein said vessel is heated to a temperature of from about 130°C to about 175°C.

18. A process for the purification of crude chlorophosphazene according to claim 17, wherein said Bronsted base is selected from the group consisting of the 1A and 1B metals of hydroxides, phosphates and carbonates.

19. A process for the purification of crude chlorophosphazene according to claim 17, wherein said Bronsted base is selected from the group consisting of calcium hydroxide, calcium phosphate and calcium carbonate.

20. A process for the purification of crude chlorophosphazene according to claim 17, wherein said vacuum is from about 25 to about 50 mm of mercury.

21. A process for the purification of crude chlorophosphazene according to claim 20, wherein said amount of Bronsted base ranges from about 2 percent to about 6 percent and said vessel is heated to a temperature of from about 155°C to about 170°C.

22. A process for the purification of crude chlorophosphazene according to claim 21, wherein said Bronsted base is selected from the group consisting of the 1A and 1B metals of hydroxides, phosphates and carbonates.

23. A process for the purification of crude chlorophosphazene according to claim 21, wherein said Bronsted base is selected from the group consisting of calcium hydroxide and calcium carbonate.

24. A process for the purification of crude chlorophosphazene according to claim 21, including removing at least said cyclic chlorophosphazene trimer by distillation.

25. A process for the purification of crude chlorophosphazene according to claim 24, wherein said distillation is carried out at a vacuum of from about 10 to about 15 mm of mercury and at a temperature of from about 120°C to about 130°C.

26. A process for the purification of crude chlorophosphazene according to claim 25, wherein said Bronsted base is selected from the class consisting of the 1A and 2A metals of hydroxides, phosphates and carbonates.

27. A process for the purification of crude chlorophosphazene according to claim 25, wherein said Bronsted base is selected from the group consisting of calcium hydroxide, calcium phosphate and calcium carbonate.

28. A process for the purification of crude chlorophosphazene according to claim 20, icluding the additional steps of adding a drying agent.

29. A process for the purification of crude chlorophosphazene according to claim 28, including the additional step of adding boiling chips to said vessel.

30. A process for the purification of crude chlorophosphazene according to claim 20, wherein said Bronsted bases are anhydrous.

31. A process for the purification of crude chlorophosphazene according to claim 30, wherein said Bronsted bases have a fine particle size.

32. A process for the purification of crude chlorophosphazene according to claim 31, wherein said particle size ranges from about 10 to about 20 microns.

33. A process for the purification of crude chlorophosphazene according to claim 20, wherein said temperature is approximately 160°C.

34. A process for the purification of crude chlorophosphazene according to claim 26, including the additional step of cooling said vessel before carrying out said distallation.

35. A process for the purification of crude chlorophosphazene according to claim 34, wherein said temperature is decreased to about 110°C to about 120°C.

36. A process for the purification of crude chlorophosphazene according to claim 26, including the additional step of heating said vessel after removal of said trimer from about 140° to about 150°C and applying a vacuum from about 1 to about 5 mm of mercury to remove the cyclic tetramer of the chlorophosphazene.

* * * * *